(12) United States Patent
Sonobe

(10) Patent No.: US 10,277,134 B2
(45) Date of Patent: Apr. 30, 2019

(54) SWITCHING POWER SUPPLY DEVICE

(71) Applicant: FUJI ELECTRIC CO., LTD., Kawasaki-shi, Kanagawa (JP)

(72) Inventor: Koji Sonobe, Matsumoto (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 13 days.

(21) Appl. No.: 15/363,537

(22) Filed: Nov. 29, 2016

(65) Prior Publication Data

US 2017/0222565 A1    Aug. 3, 2017

(30) Foreign Application Priority Data

Jan. 28, 2016    (JP) ................. 2016-014864

(51) Int. Cl.
*H02M 3/335* (2006.01)
*H02M 1/14* (2006.01)
(Continued)

(52) U.S. Cl.
CPC ......... *H02M 3/33546* (2013.01); *H02M 1/14* (2013.01); *H02M 1/42* (2013.01); *H02M 1/4225* (2013.01); *H02M 3/337* (2013.01); *H02M 2001/007* (2013.01); *H02M 2001/0035* (2013.01); *H02M 2001/0058* (2013.01);
(Continued)

(58) Field of Classification Search
CPC .... H01F 27/24; H01F 27/2823; H01F 27/292; H01F 27/324; H01F 38/42; H02M 3/33507; H02M 3/33546; H02M 1/14; H02M 1/42; H02M 1/4225; H02M 3/337; H02M 2001/0035; H02M 2001/0058; H02M 2001/007; H02M 1/4241; H02M 7/4826; H02M 2007/4815; H02M 2007/4811; H02M 1/4208; Y02B 70/126;
(Continued)

(56) References Cited

U.S. PATENT DOCUMENTS 5,404,082 A  *  4/1995  Hernandez .......... H02M 1/4241
                                                     315/219
8,102,164 B2 *  1/2012  Colbeck ............. H02M 1/4225
                                                     323/271
(Continued)

FOREIGN PATENT DOCUMENTS

| JP | 5179893 | 1/2013 |
| JP | 5384973 | 10/2013 |
| JP | 2014-93810 | 5/2014 |

*Primary Examiner* — Gary L Laxton
*Assistant Examiner* — Demetries A Gibson

(57) ABSTRACT

A switching power supply device includes a first converter of boost type to which a full-wave rectified AC power supply is input, and a second converter of current resonant type to which an output of the first converter is supplied as an input voltage. The second converter has a normal mode for performing power supply control by continuously outputting an output of an oscillator to a switching element of the second converter and a standby mode for performing power supply control by intermittently outputting the output of the oscillator thereto under light load by comparing a feedback voltage from a secondary side of an isolation transformer with a threshold voltage. The second converter corrects the threshold voltage according to an output voltage of the first converter.

20 Claims, 7 Drawing Sheets

(51) Int. Cl.
*H02M 1/42* (2007.01)
*H02M 3/337* (2006.01)
*H02M 1/00* (2006.01)

(52) U.S. Cl.
CPC ......... *Y02B 70/126* (2013.01); *Y02B 70/1433* (2013.01); *Y02B 70/1491* (2013.01); *Y02B 70/16* (2013.01); *Y02P 80/112* (2015.11)

(58) Field of Classification Search
CPC ............ Y02B 70/1433; Y02B 70/1491; Y02B 70/16; Y02P 80/112
See application file for complete search history.

(56) References Cited

U.S. PATENT DOCUMENTS

| | | | | |
|---|---|---|---|---|
| 8,853,957 | B2* | 10/2014 | Ge | H05B 33/0815 315/247 |
| 2005/0269997 | A1* | 12/2005 | Usui | H02M 1/4225 323/207 |
| 2008/0089100 | A1* | 4/2008 | Park | H02M 3/33515 363/21.01 |
| 2008/0198638 | A1* | 8/2008 | Reinberger | H02M 3/3376 363/74 |
| 2009/0091957 | A1* | 4/2009 | Orr | H02M 1/4225 363/79 |
| 2010/0020578 | A1* | 1/2010 | Ryu | H02M 1/4225 363/68 |
| 2011/0205770 | A1* | 8/2011 | Isogai | H02M 1/32 363/78 |
| 2011/0311259 | A1* | 12/2011 | Hayasaki | H02M 1/44 399/88 |
| 2013/0250627 | A1* | 9/2013 | Herfurth | H02M 3/3376 363/21.15 |
| 2014/0009970 | A1* | 1/2014 | Brinlee | H02M 1/4225 363/21.01 |
| 2014/0009978 | A1* | 1/2014 | Brinlee | H02M 1/4225 363/25 |
| 2014/0091720 | A1* | 4/2014 | Brinlee | H05B 33/0815 315/186 |
| 2014/0126254 | A1* | 5/2014 | Al-Shyoukh | G05F 1/468 363/49 |
| 2015/0098254 | A1* | 4/2015 | Brinlee | H02M 3/3376 363/21.02 |
| 2015/0198634 | A1* | 7/2015 | Brinlee | G01R 31/28 324/72.5 |
| 2015/0249390 | A1* | 9/2015 | Fahlenkamp | H02M 3/33507 363/21.15 |

* cited by examiner

SWITCHING POWER SUPPLY DEVICE

CROSS REFERENCE TO RELATED APPLICATIONS AND INCORPORATION BY REFERENCE

This application claims benefit of priority under 35 USC 119 based on Japanese Patent Application No. 2016-014864 filed on Jan. 28, 2016, the entire contents of which are incorporated by reference herein.

TECHNICAL FIELD

The present invention relates to a current resonant type switching power supply device.

BACKGROUND ART

This kind of current resonant type switching power supply device is configured as depicted in FIG. 5. The switching power supply device includes a full-wave rectifier circuit 101 that rectifies a commercial AC, a power factor correction type first converter 102 to which an AC full-wave rectified output of the full-wave rectifier circuit 101 is input, and a current resonant type second converter 103 to which a DC output of the first converter 102 is supplied.

The second converter 103 is an LLC current resonant type converter, and includes an isolation transformer 104 having a primary winding L1 and a secondary winding L2, a capacitor 105 connected to the primary winding L1 of the isolation transformer 104 to form an LLC resonant circuit with a leakage inductance of the isolation transformer 104, a half-bridge circuit 106 having two switching elements connected to the winding L1 of a primary side of the isolation transformer 104, and a power supply control circuit 107 that drives the switching elements forming the half-bridge circuit.

Herein, for example, as described in JP 5384973 B, the power supply control circuit 107 includes a setting means that sets a normal mode for performing power supply control by continuously operating an oscillator and a burst mode for performing power supply control by intermittently operating the oscillator and a burst operation setting means that detects an output voltage of a secondary side of the isolation transformer when the burst mode is set by the setting means, in which the burst operation setting means starts a switching pulse oscillation operation upon reduction of the output voltage of the secondary side, and stops the switching pulse oscillation operation upon return of the output voltage of the secondary side.

FIG. 6 is a simplified illustration of a circuit structure of the burst operation setting means. Specifically, a burst operation setting circuit 111 includes a feedback voltage input terminal $t_{FB2}$ to which a feedback voltage is input from the secondary winding L2 side of the isolation transformer and a standby command input terminal $t_{STB2}$ to which a standby command signal input from an unillustrated standby command circuit is input via a photocoupler 112.

Additionally, the burst operation setting circuit 111 includes a comparator 113, to a non-inverting input terminal of which a feedback voltage $V_{FB2}$ input to the feedback voltage input terminal $t_{FB2}$ is input and to an inverting input terminal of which a threshold voltage $V_{ref1}$ is input, a constant current circuit 114 that supplies a constant current to the standby command input terminal $t_{STB2}$, an inverter 115 to which a connection point between the constant current circuit 114 and the standby command input terminal $t_{STB2}$ is connected and which performs sign inversion, and an OR circuit 116 to which an output of the comparator 113 and an output of the inverter 115 are input.

When an output of the OR circuit 116 is at a high level, the power supply control circuit 107 goes into a switching operation state, and when at a low level, the power supply control circuit 107 goes into a switching stop state. When the normal mode is set by a signal from outside, a phototransistor forming the photocoupler 112 is turned on, causing the input of the inverter 115 to go to a low level. As a result of that, the output of the inverter 115 and the output of the OR circuit 116 go to a high level, thereby causing the power supply control circuit 107 to go into the switching operation state. On the other hand, when the burst mode is set by a signal from outside, the phototransistor forming the photocoupler 112 is turned off, causing the input of the inverter 115 to go to a high level. As a result of that, since the output of the inverter 115 goes to a low level, whether or not the power supply control circuit 107 goes into the switching stop state is determined by a magnitude correlation between the feedback voltage $V_{FB2}$ and the threshold voltage $V_{ref1}$.

SUMMARY OF THE INVENTION

Meanwhile, in the current resonant type second converter 103, a relationship between a switching operation frequency $f_{SW}$ and the feedback voltage $V_{FB2}$ is depicted by a characteristic curve CL1 of FIG. 7A, in which as the feedback voltage $V_{FB2}$ increases, the switching operation frequency $f_{SW}$ decreases.

On the other hand, in order to reduce a standby voltage, the first converter 102 turns off a boosting switching element $Q_{SW}$ during standby time to stop switching operation. At this time, an output capacitor C1 that determines an output voltage of the first converter 102 will be connected to the full-wave rectifier circuit 101 via a diode D1 and an inductor L1, so that a full-wave rectified AC voltage will be supplied thereto.

Thereby, when the AC input voltage increases, a bulk voltage generated across the output capacitor C1 of the first converter 102, which is the output voltage of the first converter 102 and also is the input voltage of the second converter 103, also increases according thereto.

Then, even during standby time, the power supply control circuit 107 of the second converter 103 continues control. The power supply control circuit 107 receives power supply from the capacitor C1 that supplies the bulk voltage, in which when the AC input voltage decreases and becomes smaller than the bulk voltage, energy (electric charge) of the capacitor determining the bulk voltage is consumed by the power supply control circuit 107, whereby the bulk voltage decreases.

In this way, during standby time, the bulk voltage that is the input power supply of the power supply control circuit 107 changes with the output of the full-wave rectifier circuit 101, i.e., the AC input voltage of an input side of the full-wave rectifier circuit 101.

Then, when the output voltage changes with a change in a load, an input voltage, or the like of the second converter 103, the feedback voltage $V_{FB2}$ also changes. The switching frequency $f_{SW}$ is changed according to the change in the feedback voltage $V_{FB2}$, whereby the output voltage is controlled to be a target control voltage. At this time, the switching frequency $f_{SW}$ of the second converter 103 changes with respect to the feedback voltage $V_{FB2}$ along the characteristic curve CL1 of FIG. 7A.

As described above, when the switching operation of the first converter 102 is stopped for reducing standby power during a time of standby operation, the bulk voltage that is the input of the power supply control circuit 107 changes with an AC input voltage input to the full-wave rectifier circuit 101.

At this time, the switching frequency $f_{SW}$ in the case in which the output voltage of the second converter 103 becomes a target control voltage changes with a bulk voltage $V_{bulk}$, as depicted by a characteristic curve CL2 of FIG. 7B. In FIG. 7B, the upper side of the characteristic curve CL2 is a continuous operation region, and the lower side thereof is a burst operation region. In FIG. 7B, the reason why the lower side of the characteristic curve CL2 is the burst operation region in this way is that, in the LLC current resonant type converter, the lower the operation frequency is, the larger the energy sent to the secondary side of the isolation transformer is, whereas the higher the operation frequency is, the smaller the energy sent thereto is. Due to this, when it is lower than a control frequency, excessive energy is sent to the secondary side of the isolation transformer, thereby increasing the output voltage. Thereby, the feedback voltage $V_{FB2}$ decreases, resulting in feedback voltage $V_{FB2}$<threshold voltage $V_{ref1}$, which is in the burst operation region.

In addition, the larger the input voltage of the second converter 103, i.e., the bulk voltage $V_{bulk}$ output from the first converter 102 is, the larger the energy sent to the secondary side of the isolation transformer is. Thus, in FIG. 7B, the higher the input voltage is, the higher the control frequency is (the lower the transmission efficiency is) (energy consumed at the load=energy sent to the secondary side is constant regardless of the input voltage).

A characteristic curve CL3 in the case in which the output voltage of the second converter 103 becomes the target control voltage is as depicted by a characteristic curve CL3 of FIG. 7C, in which the feedback voltage $V_{FB2}$ decreases according to an increase in the bulk voltage $V_{bulk}$. Additionally, FIG. 7C corresponds to a result of synthesis of FIGS. 7A and 7B (a result plotted by determining feedback voltages $V_{FB2}$ of FIG. 7A with respect to the horizontal axis of FIG. 7B via switching frequencies $f_{SW}$). In addition, in FIG. 7C, the upper region of the characteristic curve CL3 is a region where burst operation is needed, since the feedback voltage $V_{FB2}$ is larger, whereas the switching frequency $f_{SW}$ is lower, and the energy sent to the secondary side of the isolation transformer becomes larger. On the contrary, the lower region of the characteristic curve CL3 is a region where continuous operation is needed.

Then, the feedback voltage $V_{FB2}$ is supplied to the comparator 113 and compared with the threshold voltage $V_{ref1}$. When $V_{FB2} \geq V_{ref1}$, the output of the comparator 113 goes to a high level. By keeping this state, the power supply control circuit 107 will continue switching operation. When $V_{FB2} < V_{ref1}$, the output of the comparator 113 goes to a low level, and the switching operation is stopped.

Meanwhile, the relationship between the feedback voltage $V_{FB2}$ and the bulk voltage $V_{bulk}$ is as depicted in FIG. 7C. When the threshold voltage $V_{ref1}$ of a constant value is set in such a setting that performs burst (intermittent) operation when the bulk voltage $V_{bulk}$ is a high voltage, for example, close to 380 V (equivalent to 270 Vac), the threshold voltage $V_{ref1}$ is larger than a control feedback voltage $V_{FB2}$ at the bulk voltage $V_{bulk}$ of 380 V (equivalent to 270 Vac), and therefore the power supply control circuit 107 performs burst operation. However, when the bulk voltage $V_{bulk}$ is 250 V (equivalent to 180 Vac), the threshold voltage $V_{ref1}$ is smaller than the control feedback voltage $V_{FB2}$, and thus, at a feedback voltage $V_{FB2}$ indicated by a circular mark in FIG. 7C, the output of the comparator 113 goes to a high level. Accordingly, the power supply control circuit 107 cannot shift to burst operation and will continue switching operation.

As above, there is a problem in that even in a standby mode, the power supply control circuit 107 is put in a continuous switching state when the AC input voltage is low, which increases standby power.

Accordingly, the present invention has been accomplished in view of the problem of the conventional example, and it is an object of the present invention to provide a switching power supply device that can reduce standby power regardless of changes in AC input voltage in a standby mode.

According to one aspect of the present invention, there is provided a switching power supply device including: a first converter of boost type to which a full-wave rectified AC power supply is input and which outputs a DC voltage; and a second converter that includes an isolation transformer having a primary winding to which an output of the first converter is supplied, the second converter having a normal mode for performing power supply control by continuously outputting an output of an oscillator to a switching element connected to the primary winding of the isolation transformer and a standby mode for performing power supply control by intermittently outputting the output of the oscillator thereto under light load, wherein, in the standby mode, the first converter stops operation, and wherein, in the standby mode, the second converter controls switching operation by comparing a feedback voltage from a secondary side of the isolation transformer with a threshold voltage and corrects the threshold voltage according to an output voltage of the first converter.

According to the one aspect of the present invention, in a standby mode, switching operation is controlled by comparing a feedback voltage from the secondary side of the isolation transformer with a threshold voltage, and the threshold voltage is corrected according to an output voltage of the first converter that is also an input voltage of the second converter. Thus, intermittent switching operation can be maintained regardless of changes in the input voltage of the second converter, so that power consumption during standby time can be reduced.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF THE DRAWINGS

FIGS. 4A to 4C are charts depicting characteristics of a second converter in the one embodiment of the present invention, in which FIG. 4A is a characteristic chart depicting a relationship between feedback voltage and switching frequency, FIG. 4B is a characteristic chart depicting a relationship between bulk voltage and switching frequency, and FIG. 4C is a characteristic chart depicting a relationship between bulk voltage and feedback voltage;

FIGS. 7A to 7C are charts depicting characteristics of a power supply control circuit of the conventional example, in which FIG. 7A is a characteristic chart depicting a relationship between feedback voltage and switching frequency, FIG. 7B is a characteristic chart depicting a relationship between bulk voltage and switching frequency, and FIG. 7C is a characteristic chart depicting a relationship between bulk voltage and feedback voltage.

DETAILED DESCRIPTION

Figure 1:
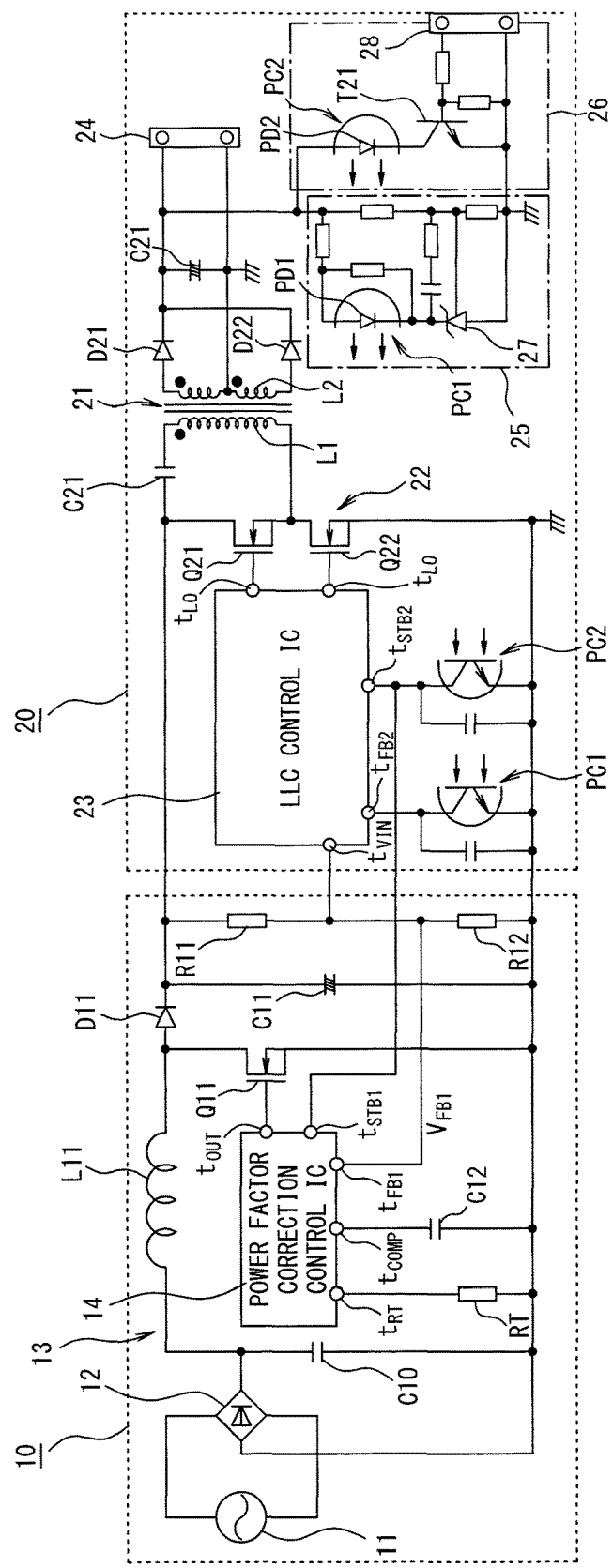
FIG. 1 is a circuit diagram depicting a switching power supply device according to one embodiment of the present invention.

Next, an embodiment of the present invention will be described with reference to the drawings. In the following descriptions of the drawings, the same or similar elements are denoted by the same or similar reference numerals.

In addition, it is to be noted that the embodiment given below exemplifies a device and a method for embodying the technical idea of the present invention, but the technical idea thereof does not limit materials, shapes, structures, arrangements, and the like of components to those described below. Various changes can be added to the technical idea of the present invention within the technical range as defined by claims stated in the scope of claims.

Hereinafter, a switching power supply device according to an embodiment of the present invention will be described with reference to the drawings.

As depicted in FIG. 1, the switching power supply device has a two-stage structure including a boost first converter 10 that serves as a power factor correction circuit and a second converter 20 that serves as an LLC current resonant type converter.

The first converter 10 includes a full-wave rectifier circuit 12 connected to a commercial AC power supply 11 and a boost power factor correction circuit 13 to which DC power output from the full-wave rectifier circuit 12 is supplied. A smoothing capacitor C10 is connected to an output side of the full-wave rectifier circuit 12.

The power factor correction circuit 13 includes a series circuit including an inductor L11 and a diode D11 connected to a positive output side of the full-wave rectifier circuit 12, a power storage capacitor C11 that is an output capacitor of the first converter 10 connected between a cathode side of the diode D11 and a negative output side of the full-wave rectifier circuit 12, a boosting switching element Q11 connected between a junction of the inductor L11 and an anode side of the diode D11 and the negative output side of the full-wave rectifier circuit 12, and a power factor correction control IC 14 that drives the boosting switching element Q11.

As depicted in FIG. 1, the power factor correction control IC 14 includes at least a feedback terminal $t_{FB1}$ to which a junction of voltage divider resistors R11 and R12 connected in parallel with the power storage capacitor C11 is connected, an error detection-compensation terminal $t_{COMP}$ to which a capacitor C12 that is a phase compensation circuit is connected, a terminal $t_{RT}$ to which a resistor RT for determining the gradient of a ramp signal generated by a ramp signal generation circuit is connected, a standby signal input terminal $t_{STB1}$ to which a standby signal that will be described later is input, an output terminal $t_{OUT}$, and an unillustrated ground terminal for inputting a low potential-side reference potential (a potential of the negative output side of the full-wave rectifier circuit 12).

Figure 2:
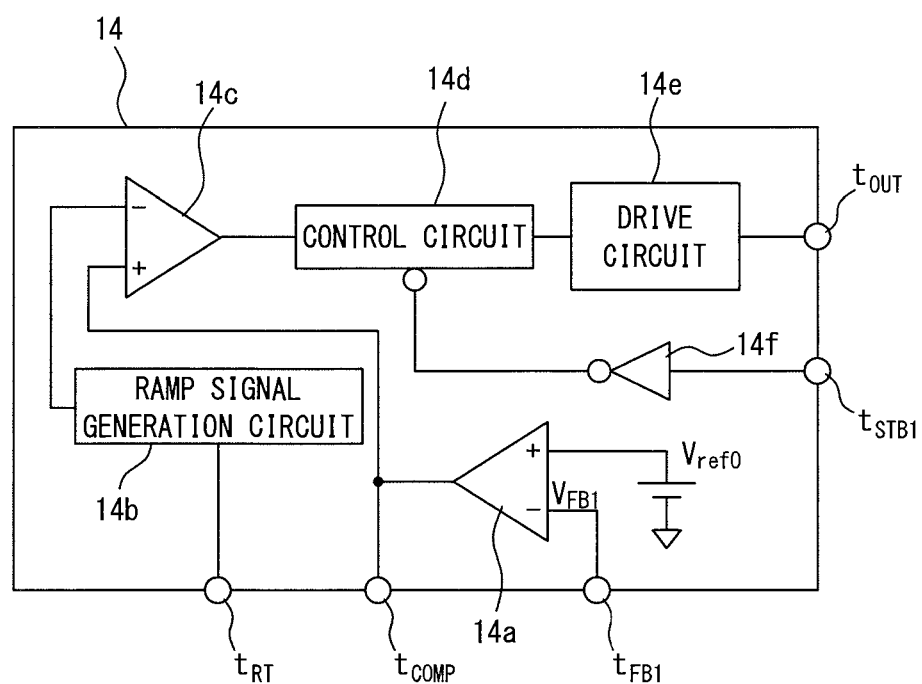
FIG. 2 is a block diagram depicting a specific structure of a power factor correction control IC of FIG. 1.

Additionally, as depicted in FIG. 2, the power factor correction control IC 14 includes an error amplifier 14a, to an inverting input side of which a feedback voltage $V_{FB1}$ input to the feedback terminal $t_{FB1}$ is supplied, to a non-inverting input side of which a reference voltage $V_{ref0}$ that serves as a target output voltage is input, and which amplifies a difference between both voltages, a ramp signal generation circuit 14b connected to an outside resistor RT via the terminal $t_{RT}$, a comparator 14c that compares a ramp signal output from the ramp signal generation circuit 14b with an error signal output from the error amplifier 14a, a control circuit 14d that controls on and off of the boosting switching element Q11 on the basis of a comparison result of the comparator 14c, and a drive circuit 14e that controls a gate of the boosting switching element Q11 on the basis of a drive signal output from the control circuit 14d.

Herein, a constant voltage is applied to the resistor RT by the ramp signal generation circuit 14b to determine the gradient of a ramp signal by a current that flows to the resistor RT. In addition, the phase compensation circuit connected to the error detection-compensation terminal $t_{COMP}$ eliminates a ripple in an error signal due to a full-wave rectified AC input voltage, so that error signals during a single cycle of the full-wave rectified AC input will be at a substantially constant value. This allows an on-time of the boosting switching element Q11 in each switching cycle to be constant even if the full-wave rectified AC input voltage changes. Thus, a peak value of a current that flows to the inductor L11 becomes proportional to the full-wave rectified AC input voltage, therefore achieving power factor correction.

Then, a standby signal input to the standby terminal $t_{STB1}$ is supplied to a negative logic input terminal of the control circuit 14d via an inverter 14f that serves as a sign inversion circuit. When the standby signal is at a low level and the output of the inverter 14f is at a high level, the control circuit 14d becomes active and causes the boosting switching element Q11 to continue switching operation. In addition, when the standby signal is at a high level and the output of the inverter 14f is at a low level, the control circuit 14d stops the switching operation and keeps the boosting switching element Q11 in an off state.

The second converter 20 includes an isolation transformer 21 having a primary winding L1 and a secondary winding L2, a capacitor C21 that is connected to the primary winding L1 of the isolation transformer 21 and that is a resonant capacitor forming an LLC resonant circuit together with a leakage inductance of the isolation transformer 21, a half-bridge circuit 22 including a switching element Q22 connected in series to the primary winding L1 of the isolation transformer 21 and a switching element Q21 connected in parallel to the primary winding L1 of the isolation transformer 21 and the capacitor C21, and an LLC control IC 23 as an LLC control unit that controls the switching elements Q21 and Q22 of the half-bridge circuit 22. In addition, instead of the leakage inductance of the isolation transformer 21, a resonant inductor may be added and connected in series to the capacitor C21 to form a resonant circuit.

In addition, the second converter 20 includes an output terminal 24 whose one end is connected to both ends of the secondary winding L2 of the isolation transformer 21 via diodes D21 and D22 and whose other end is connected to an intermediate tap of the secondary winding L2 of the isolation transformer 21, a power storage capacitor C21 that is an output capacitor of the second converter 20 connected between cathodes of the diodes D21 and D22 and the intermediate tap of the secondary winding L2 of the isolation transformer 21, i.e., the output capacitor of the switching power supply device, a feedback circuit 25 that feeds back a secondary-side voltage of the isolation transformer 21, and a standby circuit 26 to which a standby signal is input from outside.

The feedback circuit 25 is formed by using a shunt regulator 27 connected in series to a photodiode PD1 forming a feedback photocoupler PC1. The feedback circuit 25 compares a voltage obtained by resistive voltage division of the voltage of the power storage capacitor C21, i.e., the voltage of the output terminal 24 with a reference voltage in the shunt regulator 27 and flows a current according to a result of the comparison to the photodiode PD1. Thereby, feedback is performed in such a manner that the lower the voltage of the output terminal 24 is (the larger the load is), the smaller the amount of light generated from the photodiode PD1 is.

In the standby circuit 26, an NPN transistor T21 is connected in series to a photodiode PD2 forming a standby photocoupler PC2. A standby signal at a high level during normal time and at a low level during standby time is input to a base of the NPN transistor T21 from an outside connection terminal 28 to turn on the photodiode PD2 during the normal time and turn off the photodiode PD2 during the standby time.

Figure 3:
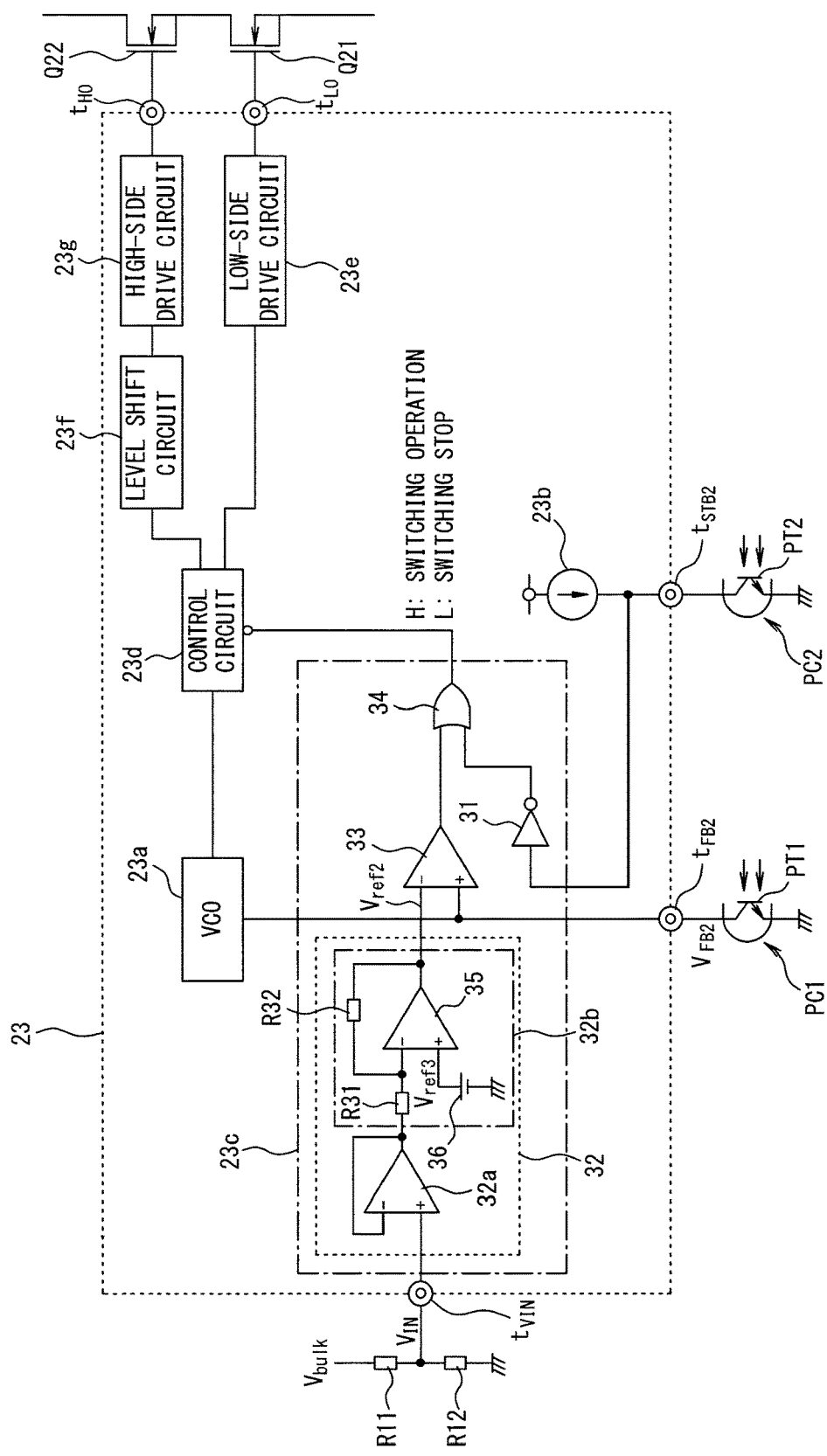
FIG. 3 is a block diagram depicting a specific structure of an LLC control IC of FIG. 1.

As depicted in FIG. 3, the LLC control IC 23 includes a feedback terminal $t_{FB2}$ connected to the negative side of the full-wave rectifier circuit 12 via a phototransistor PT1 forming the feedback photocoupler PC1, a standby terminal $t_{STB2}$ similarly connected to the negative side of the full-wave rectifier circuit 12 via a phototransistor PT2 of the standby photocoupler PC2, an input voltage terminal $t_{VIN}$ to which a junction of the voltage divider resistors R11 and R12 connected to the output side of the first converter 10 is connected, and a low-side output terminal $t_{LO}$ and a high-side output terminal $t_{HO}$, respectively, connected to gates of the switching elements Q21 and Q22 of the half-bridge circuit 22. In addition, a junction of the phototransistor PT2 of the standby photocoupler PC2 and the standby terminal $t_{STB2}$ is connected to the standby terminal $t_{STB1}$ of the power factor correction control IC 14.

As described above, as the load is larger, the amount of light generated from the photodiode PD1 forming the photocoupler PC1 becomes smaller, as a result of which an on-resistance of the phototransistor PT1 forming the photocoupler PC1 increases, which therefore increases the feedback voltage $V_{FB2}$.

In addition, the LLC control IC 23 includes a voltage-controlled oscillator (VCO) 23a that is connected to the feedback terminal $t_{FB2}$ and that oscillates at a frequency according to the feedback voltage $V_{FB2}$, a constant current circuit 23b connected to the standby terminal $t_{STB2}$, a burst operation setting circuit 23c connected to the circuit feedback terminal $t_{FB2}$, the input voltage terminal $t_{VIN}$, and a junction of the standby terminal $t_{STB2}$ and the constant current circuit 23b, a control circuit 23d that switches between a switching operation state for causing an oscillation output of the voltage-controlled oscillator 23a to pass through and a switching stop state for shutting off the oscillation output thereof on the basis of an output of the burst operation setting circuit 23c, a low-side drive circuit 23e to which a low-side output signal output from the control circuit 23d is input, and a high-side drive circuit 23g to which a high-side output signal output from the control circuit 23d is input via a level shift circuit 23f.

Herein, as depicted in FIG. 3, the burst operation setting circuit 23c includes an inverter 31 that serves as a sign inversion circuit connected to the junction of the standby terminal $t_{STB2}$ and the constant current circuit 23b, a correction circuit 32 connected to the input voltage terminal $t_{VIN}$ to form a threshold voltage $V_{ref2}$, a comparator 33 that compares the threshold voltage $V_{ref2}$ output from the correction circuit 32 with the feedback voltage $V_{FB2}$ input to the feedback terminal $t_{FB2}$, and an OR circuit 34 to which a comparison output of the comparator 33 and an output of the inverter 31 are input.

The correction circuit 32 includes a buffer (voltage follower) 32a connected to the input voltage terminal $t_{VIN}$ and an inverting amplifier with offset 32b connected to an output side of the buffer 32a. The inverting amplifier with offset 32b includes an operational amplifier 35 and is provided with a resistor R31 connected between an inverting input side of the operational amplifier 35 and an output side of the buffer 32a, a resistor R32 that is connected in series to the resistor R31 and whose other end is connected to an output side of the operational amplifier 35, and a DC power supply 36 for inputting a reference voltage $V_{ref3}$ connected to a non-inverting input terminal of the operational amplifier 35.

Figure 4A:
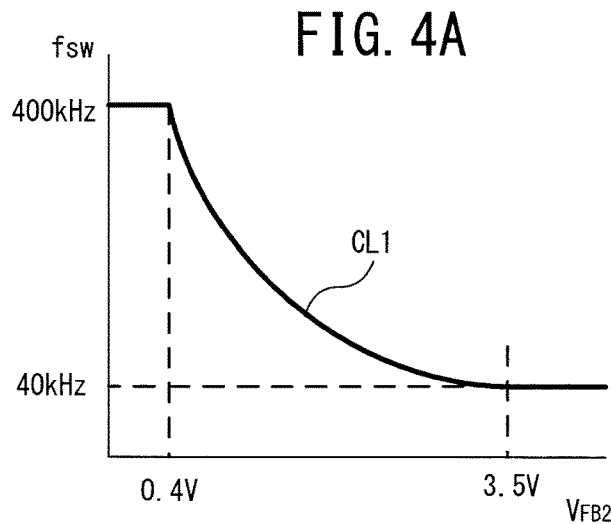
Figure 4B:
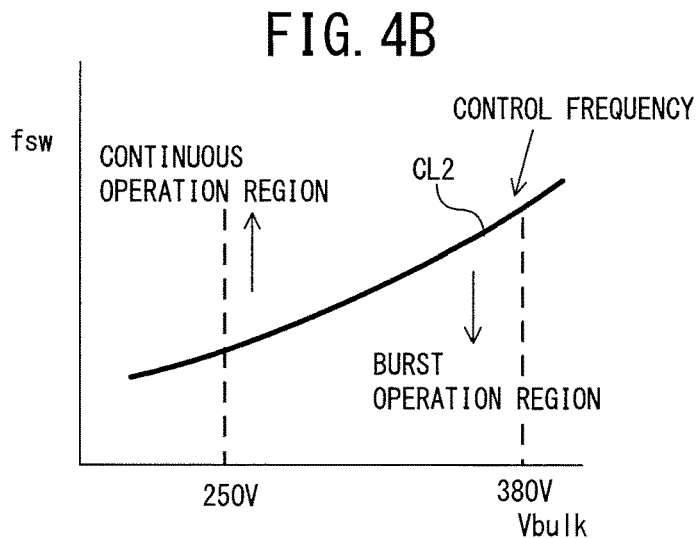
Figure 4C:
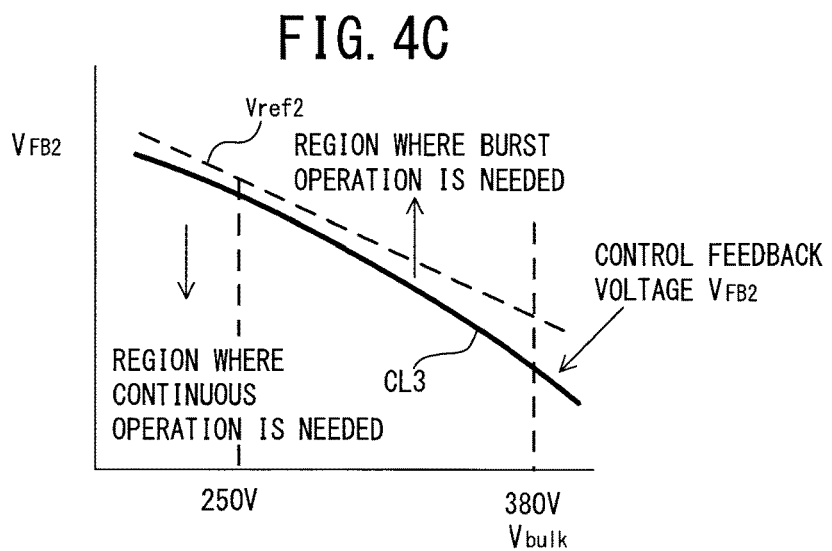

In the correction circuit 32, a divided voltage $V_{IN}$ of the bulk voltage $V_{bulk}$ that is the output voltage of the first converter 10 is input to the inverting amplifier with offset 32b via the buffer 32a, whereby, as illustrated by a broken line of FIG. 4C), there is formed a threshold voltage $V_{ref2}$ that increases as the bulk voltage $V_{bulk}$ decreases, for example, from 380 V (equivalent to 270 Vac) and becomes slightly higher than a characteristic curve CL3 representing bulk voltage-feedback voltage characteristics of the second converter 20 (which is similar to that of the second converter 103 described above). In addition, assuming that a voltage division ratio by the resistors R11 and R12 is K, $V_{IN}=K*V_{bulk}$, and also when resistance values of the resistors R31 and R32 are represented by R31 and R32, the $V_{ref2}$ is as in the following formula:

$$V_{ref2}=V_{ref3}-(R32/R31)(K*V_{bulk}-V_{ref3})$$

Next, operations of the above embodiment will be described.

For example, in a normal mode, a standby signal input to the outside connection terminal 28 of the second converter 20 depicted in FIG. 1 is at a high level, whereby the transistor T21 of the standby circuit 26 turns on, and the photodiode PD2 forming the photocoupler PC2 turns on. As a result, the phototransistor PT2 forming the photocoupler PC2 turns on, whereby the standby terminal $t_{STB1}$ of the power factor correction control IC 14 and the standby terminal $t_{STB2}$ of the LLC control IC 23 are connected to the negative side of the full-wave rectifier circuit 12 and go to a low level.

Due to this, in the power factor correction control IC 14 of the first converter 10, the low-level standby signal is inverted by the inverter 14f and then input to the negative logic input terminal of the control circuit 14d, so that the control circuit 14d becomes active, resulting in normal switching operation.

On the other hand, in the second converter 20, when the standby terminal $t_{STB2}$ goes to the low level, the standby signal is inverted by the inverter 31, as a result of which a high level signal is input to a negative logic terminal of the control circuit 23d via the OR circuit 34. Thereby, an oscillation signal from the voltage-controlled oscillator 23a according to the feedback voltage $V_{FB2}$ corresponding to a DC output voltage (a loaded state) of the secondary side of the isolation transformer 21 is output as a low-side signal from the control circuit 23d to the low-side switching element Q21 via the low-side drive circuit 23e. Simultaneously with this, a high-side signal having a phase opposite to the low-side signal is level shifted by the level shift circuit 23f and then output to the high-side switching element Q22 from the control circuit 23d via the high-side drive circuit 23g.

Thereby, the resonant frequency of the LLC resonant circuit formed by the capacitor C21 and the leakage inductance of the isolation transformer 21 is controlled. When the output voltage changes due to a load, a change in the input voltage, or the like of the second converter 20, the feedback voltage $V_{FB2}$ also changes. As the switching frequency is changed according to the change of the feedback voltage $V_{FB2}$, the output voltage is controlled to be a target control voltage. At this time, the switching frequency $f_{SW}$ of the second converter 20 changes with respect to the feedback voltage $V_{FB2}$ along a characteristic curve CL1 of FIG. 4A.

Figure 7A:
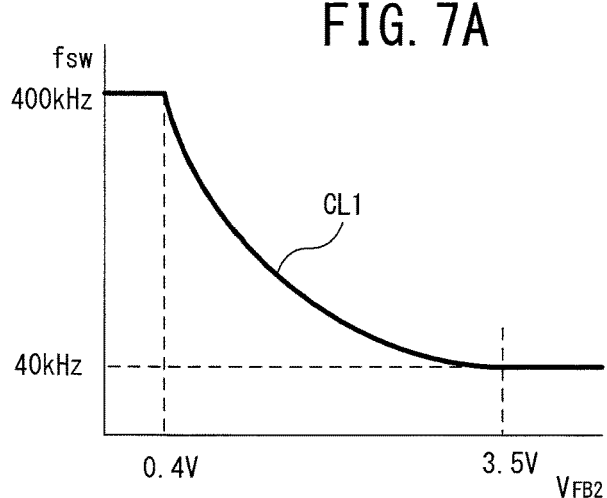
Figure 7B:
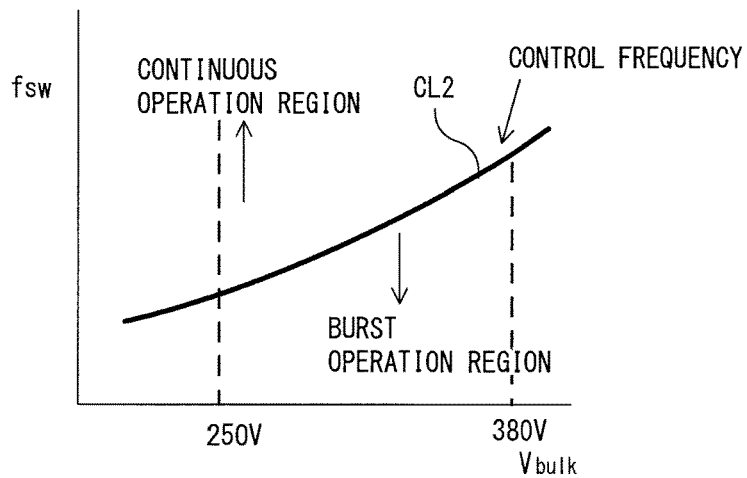
Figure 7C:
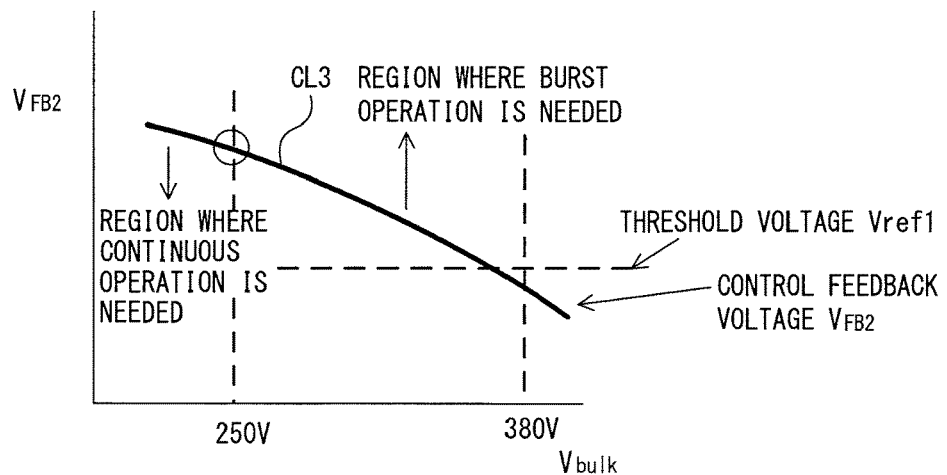

In addition, the relationship between the switching frequency $f_{SW}$ at which a predetermined output voltage is obtained and the bulk voltage $V_{bulk}$ changes depending on the bulk voltage $V_{bulk}$, as depicted by a characteristic curve CL2 of FIG. 4B. As with FIG. 7B, the upper side of the characteristic curve CL2 of FIG. 4B is a continuous operation region, and the lower side thereof is a burst operation region.

In the secondary winding L2 of the isolation transformer 21, a resonant current is rectified by the diodes D21 and D22 connected to both ends thereof, stored in the power storage capacitor C21, and output from the output terminal 24.

In contrast, in a standby mode, since a standby signal input to the outside connection terminal 28 of the standby circuit 26 goes to a low level, the transistor T21 turns off, and the photodiode PD2 of the standby photocoupler PC2 turns off. As a result, the phototransistor PT2 forming the standby photocoupler PC2 of the second converter 20 turns off, and a standby signal input to the standby terminal $t_{STB1}$ goes to a high level.

Figure 5:
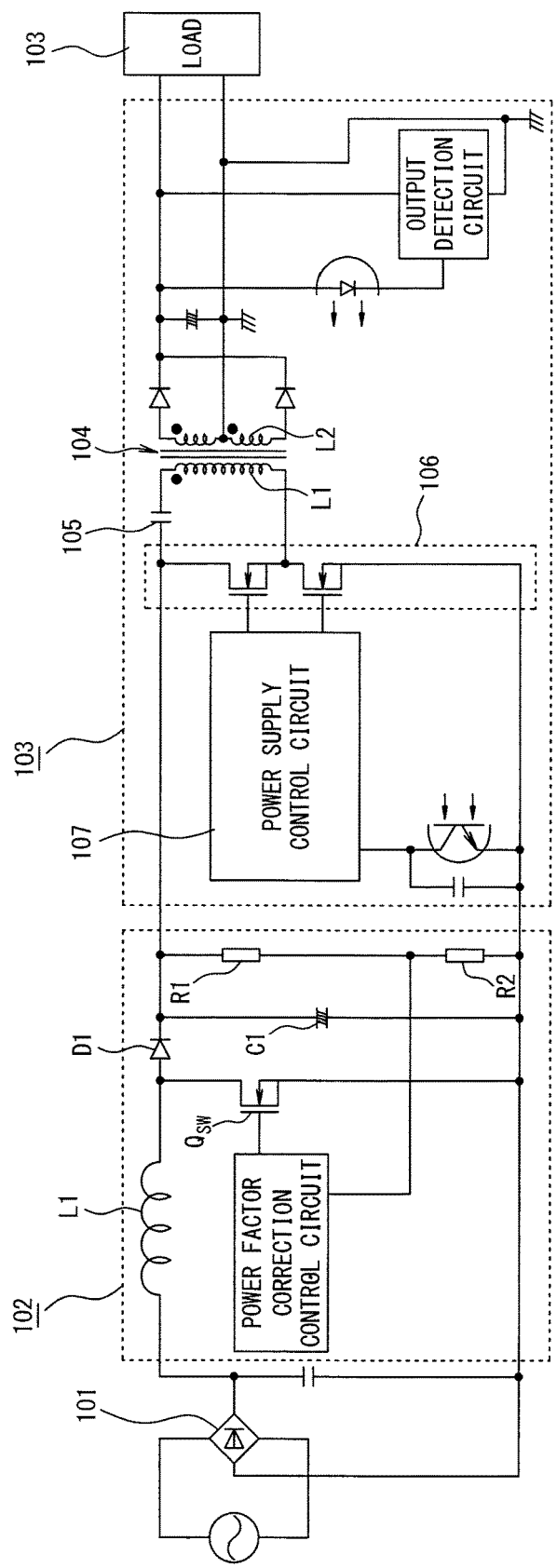
FIG. 5 is a circuit diagram depicting a conventional switching power supply device.
Figure 6:
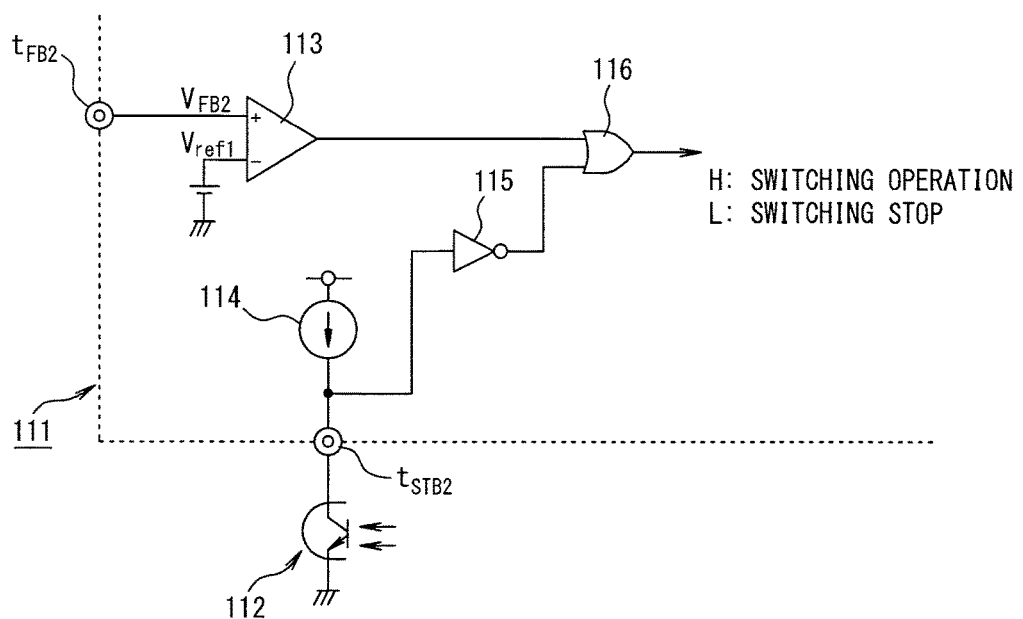
FIG. 6 is a circuit diagram depicting a burst operation setting means in a power supply control circuit of FIG. 5.

Thereby, the output of the inverter 14f of the power factor correction control IC 14 of the first converter 10 goes to a low level, whereby the control circuit 14d stops the switching operation of the first converter 10 based on the ramp signal generation circuit 14b, as a result of which driving of the boosting switching element Q11 by the drive circuit 14e is stopped, resulting in a standby state (Q11 goes into an off state). At this time, since the boosting operation by the first converter 10 is stopped, the bulk voltage $V_{bulk}$ across the power storage capacitor C11 becomes a voltage that changes according to a full-wave rectified AC input voltage obtained by full-wave rectifying a commercial AC voltage of the commercial AC power supply 11 through the full-wave rectifier circuit 12. In addition, since the change of the bulk voltage $V_{bulk}$ at this time is the same as that of the conventional switching power supply device depicted in FIG. 5, a detailed description thereof will be omitted.

On the other hand, in the second converter 20, the standby terminal $t_{STB2}$ of the LLC control IC 23 goes to a high level, whereby the output of the inverter 31 of the burst operation setting circuit 23c goes to a low level, which stops a switching operation instruction by the output of the inverter 31.

In contrast, in the correction circuit 32, a voltage $V_{IN}$ obtained by dividing the bulk voltage $V_{bulk}$ that is also the output voltage of the first converter 10 by the voltage divider resistors R11 and R12 is input to the buffer 32a, and an output of the buffer 32a is input to the inverting amplifier with offset 32b.

As a result, the threshold voltage $V_{ref2}$ output from the inverting amplifier with offset 32b becomes a voltage obtained by inverting-amplifying the voltage $V_{IN}$ in a state of being offset by the reference voltage $V_{ref3}$ input to the non-inverting input terminal of the operational amplifier 35 (see the above formula). Thus, as illustrated by a broken line of FIG. 4C, the threshold voltage $V_{ref2}$ increases according to reduction of the bulk voltage $V_{bulk}$ that is the voltage across the power storage capacitor C11 of the first converter 10. Specifically, when the threshold voltage $V_{ref2}$ is set so that the bulk voltage $V_{bulk}$ is larger than the control feedback voltage $V_{FB2}$ at 380 V (equivalent to 270 Vac), the threshold voltage $V_{ref2}$ slightly exceeds the control feedback voltage $V_{FB2}$ even when the bulk voltage $V_{bulk}$ reduces to 250 V (equivalent to 180 Vac). In other words, the threshold voltage $V_{ref2}$ can be set to always exceed the control feedback voltage $V_{FB2}$ regardless of fluctuation of the bulk voltage $V_{bulk}$.

Thus, when the feedback voltage $V_{FB2}$ from the secondary side of the isolation transformer 21 is input to the feedback terminal $t_{FB2}$ and the feedback voltage $V_{FB2}$ is below the threshold voltage $V_{ref2}$, the output of the comparator 33 goes to a low level, resulting in a switching stop state that stops the output of an oscillation signal of the voltage-controlled oscillator 23a from the control circuit 23d.

On the other hand, when the feedback voltage $V_{FB2}$ is equal to or more than the threshold voltage $V_{ref2}$, the output of the comparator 33 goes to a high level, and the control circuit 23d supplies an oscillation signal from the voltage-controlled oscillator 23a as a low-side signal to the low-side drive circuit 23e, thereby causing the low-side switching element Q21 to be operated in the switching operation state. Simultaneously with this, a high-side signal having a phase opposite to the low-side signal is level shifted by the level shift circuit 23f and supplied to the high-side drive circuit 23g, thereby causing the high-side switching element Q22 to be operated in the switching operation state.

Thus, in a standby mode, even when the bulk voltage $V_{bulk}$ that is also the output voltage of the first converter 10 fluctuates according to the fluctuation of a full-wave rectified AC input voltage, intermittent (burst) operation can be ensured. Accordingly, it can be surely prevented that, as in the above-described conventional example, when the threshold voltage $V_{ref2}$ is set to a constant value in a standby mode, the full-wave rectified AC input voltage is reduced and the electric charge of the power storage capacitor C11 is consumed by the LLC control IC 23, whereby the bulk voltage $V_{bulk}$ is reduced from 380 V (equivalent to 270 Vac), as a result of which the control feedback voltage $V_{FB2}$ becomes equal to or more than the threshold voltage $V_{ref2}$ and burst operation is not performed. This can ensure that power consumption in a standby mode is reduced.

Moreover, since the feedback voltage $V_{FB1}$ by the voltage divider resistors R11 and R12 in the first converter 10 is used as the input signal of the correction circuit 32 forming the threshold voltage $V_{ref2}$, it is unnecessary to additionally dispose a bulk voltage detection circuit. Furthermore, the correction circuit 32 can be made of a simple analog circuit structure that simply includes the buffer 32a to which the feedback voltage $V_{FB1}$ is input and the inverting amplifier with offset 32b to which an output of the buffer 32a is supplied.

In addition, while the above embodiment has described the case in which the correction circuit 32 includes the buffer 32a and the inverting amplifier with offset 32b, the invention is not limited thereto. Any optional circuit structure can be applied as long as the circuit structure can maintain the threshold voltage $V_{ref2}$ at a higher voltage than a control feedback voltage according to reduction of the bulk voltage $V_{bulk}$.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

REFERENCE SIGNS LIST

10 First converter
11 Commercial AC power supply
12 Full-wave rectifier circuit
13 Power factor correction circuit
14 Power factor correction control IC
14a Error amplifier
14b Ramp signal generation circuit
14c Comparator
14d Control circuit
14e Drive circuit
14f Inverter
20 Second converter
21 Isolation transformer
22 Half-bridge circuit
Q21 Low-side switching element
Q22 High-side switching element
23 LLC control IC
PC1 Feedback photocoupler
PC2 Standby photocoupler
23a Voltage-controlled oscillator
23b Constant current circuit
23c Burst operation setting circuit
23d Control circuit
23e Low-side drive circuit
23f Level shift circuit
23g High-side drive circuit
24 Output terminal
25 Feedback circuit
26 Standby circuit
31 Inverter
32 Correction circuit
32a Buffer
32b Inverting amplifier with offset
33 Comparator
34 OR circuit

The invention claimed is:

1. A switching power supply device, comprising:
a first converter of boost type to which a full-wave rectified AC power supply is input and which outputs a DC voltage; and
a second converter that includes an isolation transformer having a primary winding to which an output of the first converter is supplied, the second converter having a normal mode for performing power supply control by continuously outputting an output of an oscillator to a switching element connected to the primary winding of the isolation transformer and a standby mode for performing power supply control by intermittently outputting the output of the oscillator thereto under light load,
wherein, in the standby mode, the first converter stops operation, and
wherein, in the standby mode, the second converter
corrects a threshold voltage according to a voltage obtained by dividing an output voltage of the first converter, and
controls a switching operation by comparing a feedback voltage from a secondary side of the isolation transformer with the corrected threshold voltage.

2. The switching power supply device according to claim 1,
wherein the second converter is a current resonant converter comprising
the oscillator,
a control circuit that controls the normal mode and the standby mode, and
a burst operation setting circuit that, in the standby mode,
compares the feedback voltage with the threshold voltage and
instructs switching operation and switching stop of the control circuit, and controlling output by changing a switching frequency, and
wherein the burst operation setting circuit comprises a correction circuit that corrects the threshold voltage according to a full-wave rectified AC input voltage of the first converter.

3. The switching power supply device according to claim 2,
wherein the correction circuit reduces the threshold voltage as the full-wave rectified AC input voltage increases.

4. The switching power supply device according to claim 3,
wherein the correction circuit comprises a buffer to which a divided output voltage of the first converter is input and an inverting amplifier with offset to an inverting input side of which an output of the buffer is input.

5. The switching power supply device according to claim 4,
wherein the first converter comprises a boost power factor correction circuit, and
the second converter comprises
an LLC resonant circuit using a leakage inductance of the isolation transformer or a resonant inductor and a resonant capacitor,
a half-bridge circuit connected to the LLC resonant circuit, and
an LLC control unit that drives the half-bridge circuit, and
wherein the LLC control unit incorporates the oscillator, the control circuit, the burst operation setting circuit, and the correction circuit.

6. The switching power supply device according to claim 5,
wherein switching between the normal mode and the standby mode is performed by a signal from outside.

7. The switching power supply device according to claim 4,
wherein switching between the normal mode and the standby mode is performed by a signal from outside.

8. The switching power supply device according to claim 3, wherein the first converter comprises a boost power factor correction circuit, and
the second converter comprises
an LLC resonant circuit using a leakage inductance of the isolation transformer or a resonant inductor and a resonant capacitor,
a half-bridge circuit connected to the LLC resonant circuit, and
an LLC control unit that drives the half-bridge circuit, and
wherein the LLC control unit incorporates the oscillator, the control circuit, the burst operation setting circuit, and the correction circuit.

9. The switching power supply device according to claim 8,
wherein switching between the normal mode and the standby mode is performed by a signal from outside.

10. The switching power supply device according to claim 3,
wherein switching between the normal mode and the standby mode is performed by a signal from outside.

11. The switching power supply device according to claim 2,
wherein the first converter comprises a boost power factor correction circuit, and
the second converter comprises
an LLC resonant circuit using a leakage inductance of the isolation transformer or a resonant inductor and a resonant capacitor,
a half-bridge circuit connected to the LLC resonant circuit, and
an LLC control unit that drives the half-bridge circuit, and
wherein the LLC control unit incorporates the oscillator, the control circuit, the burst operation setting circuit, and the correction circuit.

12. The switching power supply device according to claim 11,
wherein the first converter includes an output capacitor and a series circuit including an inductor and a diode connected between the output capacitor and the full-wave rectified AC power supply.

13. The switching power supply device according to claim 12,
wherein switching between the normal mode and the standby mode is performed by a signal from outside.

14. The switching power supply device according to claim 11,
wherein switching between the normal mode and the standby mode is performed by a signal from outside.

15. The switching power supply device according to claim 2,
wherein switching between the normal mode and the standby mode is performed by a signal from outside.

16. The switching power supply device according to claim 1,
wherein switching between the normal mode and the standby mode is performed by a signal from outside.

17. A switching power supply device, comprising:
a first converter of boost type to which a full-wave rectified AC power supply is input and which outputs a DC voltage; and
a second converter that includes an isolation transformer having a primary winding to which an output of the first converter is supplied, the second converter having a normal mode for performing power supply control by continuously outputting an output of an oscillator to a switching element connected to the primary winding of the isolation transformer and a standby mode for performing power supply control by intermittently outputting the output of the oscillator thereto under light load, wherein
in the standby mode, the first converter stops operation, and
in the standby mode, the second converter
controls a switching operation by comparing a feedback voltage from a secondary side of the isolation transformer with a threshold voltage, and
corrects the threshold voltage according to an output voltage of the first converter the second converter is a current resonant converter comprising
the oscillator,
a control circuit that controls the normal mode and the standby mode, and
a burst operation setting circuit that, in the standby mode,
compares the feedback voltage with the threshold voltage and
instructs switching operation and switching stop of the control circuit, and controlling output by changing a switching frequency,
the burst operation setting circuit comprises a correction circuit that corrects the threshold voltage according to a full-wave rectified AC input voltage of the first converter, and
the correction circuit reduces the threshold voltage as the full-wave rectified AC input voltage increases, and
the correction circuit comprises a buffer to which a divided output voltage of the first converter is input and an inverting amplifier with offset to an inverting input side of which an output of the buffer is input.

18. The switching power supply device according to claim 17,
wherein the first converter comprises a boost power factor correction circuit, and
the second converter comprises
an LLC resonant circuit using a leakage inductance of the isolation transformer or a resonant inductor and a resonant capacitor,
a half-bridge circuit connected to the LLC resonant circuit, and
an LLC control unit that drives the half-bridge circuit, and
wherein the LLC control unit incorporates the oscillator, the control circuit, the burst operation setting circuit, and the correction circuit.

19. The switching power supply device according to claim 18,
wherein switching between the normal mode and the standby mode is performed by a signal from outside.

20. The switching power supply device according to claim 17,
wherein switching between the normal mode and the standby mode is performed by a signal from outside.

* * * * *